(12) United States Patent
Faye et al.

(10) Patent No.: US 7,320,837 B2
(45) Date of Patent: Jan. 22, 2008

(54) FUEL CELL SYSTEM INCLUDING A CATALYTICALLY ACTIVE REACTOR UNIT WITH FLOW CONTROL MEANS

(75) Inventors: Ian Faye, Stuttgart (DE); Ulrich Gottwick, Stuttgart (DE); Rainer Saliger, Freiberg (DE); Jan-Michael Graehn, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 697 days.

(21) Appl. No.: 10/699,908

(22) Filed: Nov. 3, 2003

(65) Prior Publication Data
US 2004/0115496 A1 Jun. 17, 2004

(30) Foreign Application Priority Data
Nov. 6, 2002 (DE) .............................. 102 51 565

(51) Int. Cl.
*H01M 8/04* (2006.01)
*H01M 8/12* (2006.01)
*H01M 4/00* (2006.01)
*H01M 2/00* (2006.01)
*H01M 2/02* (2006.01)

(52) U.S. Cl. .............................. 429/22; 429/34; 429/35

(58) Field of Classification Search .................... None
See application file for complete search history.

(56) References Cited

U.S. PATENT DOCUMENTS 6,783,877 B2 * 8/2004 Shimazu et al. .............. 429/17

* cited by examiner

*Primary Examiner*—Patrick Joseph Ryan
*Assistant Examiner*—Julian Mercado
(74) *Attorney, Agent, or Firm*—Michael J. Striker

(57) ABSTRACT

The fuel cell system has a fuel cell unit and a catalytically active reactor unit (3) for at least partial chemical transformation of an operating medium stream (1), especially a reformer, gas purifier stage and/or a combustor, in which the catalytically active reactor unit (3) has a variable catalytically active reactor volume (4) acted on by the operating medium stream. To provide the fuel cell system with a higher efficiency and good dynamic behavior the catalytically active reactor unit is provided with at least one control device (5, 8, 11, 12, 13) for controlling and/or for changing the variable catalytically active reactor volume (4) acted on by the operating medium stream (1). In a preferred embodiment the control device includes a first valve (11) for the reactor unit arranged downstream of the maximum reactor volume and a second valve (12) connected with the reactor unit upstream of the first valve, so that, when the second valve is opened and the first valve is closed, the operating medium stream (1) passes through an effective reactor volume that is smaller than the maximum reactor volume.

15 Claims, 2 Drawing Sheets

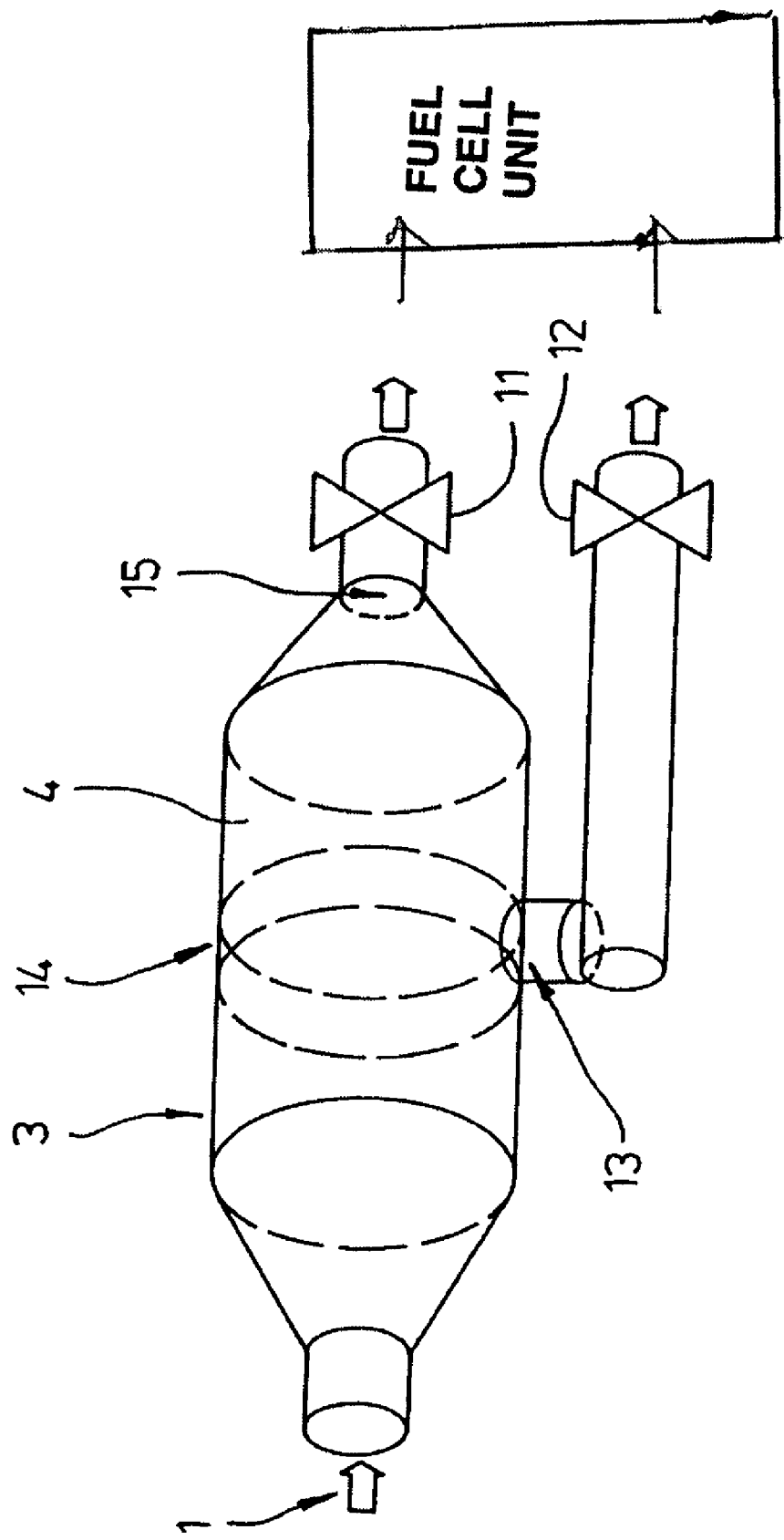

FUEL CELL SYSTEM INCLUDING A CATALYTICALLY ACTIVE REACTOR UNIT WITH FLOW CONTROL MEANS

BACKGROUND OF THE INVENTION

1. Field of the Invention

The present invention relates to a fuel cell system with a catalytically active reactor unit for at least partial chemical transformation of an operating medium stream, especially a reformer, gas purifier stage and/or a combustor, in which the catalytically active reactor unit has a catalytically active reactor volume acted on by the operating medium stream.

2. Description of the Related Art

Fuel cell technology is becoming ever more important, especially in connection with consumer-driven concepts for vehicles. Fuel cells offer the possibility to convert chemical energy directly to electrical energy, which subsequently can be converted into mechanical drive energy with the aid of an electrical motor.

Because of technical problems with the hydrogen supply in vehicles the hydrogen must be produced, as needed, e.g. by a so-called reforming unit or partial oxidation of hydrocarbons, especially by means of a catalytic reactor and/or reformer. This sort of hydrocarbon material is usually present in the form of a commercial fuel, such as gasoline or diesel fuel, however other hydrocarbon materials, for example natural gas, methane, methanol, liquified petroleum gas (LPG) or synthetic fuels, can be used for this purpose.

The reformer usually has a catalytically coated surface, especially on a porous catalyst structure with numerous channels or the like extending in the direction of flow or the fuel stream. This catalytically active surface is acted on generally with a mixture of fuel, water and/or air.

So-called PEM fuel cells are frequently used in commercial fuel cell systems, which however react to the carbon monoxide content in a hydrogen-rich medium with a "contaminated appearance" on the catalytic anode. Thus the conversion of hydrogen at the electrode is made more difficult or prevented. For this reason suitable fuel cell systems must guarantee the production of a hydrogen-enriched medium, which is as most free of carbon monoxide.

Thus the carbon monoxide content in hydrogen-enriched reformate has already been nearly completely reduced with the help of additional catalytic reactors. For example, in a first step for this purpose one reactor unit is connected downstream to the reformer, which oxidizes the carbon monoxide resulting from reforming the fuel to form $CO_2$ by addition of water by means of a so-called "shift reaction". In this "shift reaction" additional hydrogen is released. However a residue of carbon monoxide remains in the reformate gas in a concentration, which always still leads to an intolerable contamination of the fuel cell.

Additional catalytically active reactors are used, as needed, to convert the still present carbon monoxide residue, which up to now reduce the carbon monoxide residual amount nearly completely by catalytic oxidation of the remaining carbon monoxide with added oxygen in a suitable catalytic oxidation unit. In order to reduce the carbon monoxide content to a value less than 50 ppm, preferably carbon monoxide multi-stage oxidation units are used, in which oxygen is supplied separately for example to each stage. The oxygen is metered or delivered for this purpose generally in the form of air oxygen.

Furthermore additional catalytically active reactor units, for example, for methanation of reformate gas, are used in fuel cell systems alternatively or in combination with the above-described reactor units. In methanation of reformate gas hydrogen and carbon monoxide are transformed chemically to methane so that the carbon monoxide content of the reformate gas is lowered further.

Furthermore catalytically active combustors are used to produce heat in commercial fuel cell systems. For example a residual anode gas stream, a reformate gas stream of poor quality, which is produced in a starting stage or the like with comparatively low hydrogen content, is catalytically converted in a suitable combustor. Heat is produced thereby, which can be used, for example, for heating the most different parts of the fuel cell system.

Above all it is especially disadvantageous that the heat losses to the surroundings are comparatively high in current reformers in partial load operation, i.e. during throughput of comparatively small mass flows, so that they must compensate by supplying additional heat, in order to maintain the desired reformation temperature. This definitely leads to a reduced total efficiency for reforming during partial load operation. Furthermore the comparatively small flow speeds in partial load operation are disadvantageous, since above all the delay time during load change is long because of that. Also for the same reason the dynamic behavior of the entire system and/or the fuel cell system is decisively impaired.

SUMMARY OF THE INVENTION

It is an object of the present invention to provide a fuel cell system with a fuel cell unit and a catalytically active reactor unit, especially a reformer, gas purifying stage and/or combustor, which has higher efficiency of chemical transformation and better dynamic behavior in comparison to the fuel cell systems of the prior art.

It is also an object of the present invention to provide a vehicle with a fuel cell system including a catalytically active reactor unit for processing an operating medium stream, in which the fuel cell system has a higher efficiency and better dynamic behavior than prior art fuel cell systems.

It is an additional object of the present invention to provide an improved method of operating a catalytically active reactor unit in a fuel cell system, so that the fuel cell system has a higher efficiency and better dynamic behavior than prior art fuel cell systems.

These objects, and others which will be made more apparent hereinafter, are attained in a fuel cell system comprising a fuel cell unit and a catalytically active reactor unit for at least partial chemical transformation of an operating medium stream, especially a reformer, gas purifier stage and/or a combustor, in which the catalytically active reactor unit has a catalytically active reactor volume acted on by the operating medium stream.

According to the invention the catalytically active reactor unit comprises at least one control means for controlling and/or for changing the catalytically active reactor volume acted on by the operating medium stream.

Advantageous further embodiments and features of the invention are set forth in the dependent claims appended hereinbelow.

Accordingly a fuel cell system according to the invention is characterized by a catalytically active reactor unit including at least one control means or control device for controlling and/or changing the catalytically active reactor volume acted on by the operating medium stream. As needed, the total volume of the reactor unit can be greater than the catalytically active reactor volume, i.e. the part of the reactor volume effective in regard to the chemical transformation and/or conversion. For example, the total volume can also include a pre-mixing and/or distribution and/or collection unit and/or chamber with catalytically non-active volumes.

The reactor volume acted on by the operating medium stream, above all, can be adjusted to the size of the operating medium stream flowing through the reactor unit in an advantageous manner with the help of a control device according to the invention, especially an electronic controller or control unit.

Preferably the reactor volume acted on by the operating medium stream is clearly greater in full load operation than in partial load operation and/or a starting stage or the like. For example, only about $1/10$ of the amount of the operating medium stream converted in full load operation is converted in the reactor unit in partial load operation. Thus conventional catalytic reactors are clearly oversized for partial load operation. Generally partial load operation is the normal operation mode. That means that full load operation is essentially rarer or less frequent than partial load operation in relation to the service life or operating life of the system. According to the invention the oversize in partial load operation is eliminated in a preferred manner so that nearly optimum adjustment to the material flow rate is accomplished through the reactor volumes acted on by the operating medium stream. Over-proportional high heat losses in partial load operation, which are present in the prior art devices, are effectively prevented, so that the entire efficiency of the hydrogen production is decisively improved.

Several most different features can provide the control and/or change of the reactor volume acted on by the operating medium stream. In a preferred embodiment of the invention the control device is constructed to control and/or change a cross-sectional area of the reactor volume acted on by the operating medium stream, which extends transverse to the flow direction of the operating medium stream. For example, the cross-sectional area is controllable and/or changeable in at least one of its dimensions with the help of preferably, especially mechanical control means. Possibly this occurs with the help of guide/deflecting elements, a slide element or the like, which permit adjustment of the cross-sectional area of the reactor volume according to the invention.

A two-dimensional adjustment and/or control of the cross-section of the reactor volume acted on by the operating medium stream is preferably performed. For example the control means has at least one adjustable or changeable diaphragm device arranged transverse to the flow direction of the operating medium stream. If necessary the above-mentioned slide element is formed like a diaphragm. Preferably the diaphragm device is formed in the same way as and/or according to the principle of a photo stop or diaphragm, in which a substantially circular or polygonal open cross-sectional area is changeable by means of a mechanical adjusting mechanism or the like according to the invention. A suitable diaphragm device is opened as wide as possible in full load operation of the reactor unit and in partial load operation it is at least partially closed.

In an additional preferred embodiment of the invention the control means or device has at least one control element movable or adjustable in the flow direction of the operating medium stream. The change of effective cross-sectional area of the reactor volume acted on by the operating medium stream is accomplished by a suitable axial adjusting or shifting of the control element. For example, the control element may be a pipe or the like, which is arranged immediately or directly at the fixed bed reactor or spaced from it and axially movable or adjustable relative to it. For example, the operating medium stream acts on the entire cross-sectional area of the reactor volume when the control element is spaced as far as possible from the fixed bed reactor. When the control element is arranged right on the fixed bed reactor the operating medium stream only acts on a relevant part of the cross-sectional area of the reactor volume.

Generally the fixed bed reactor can have a monolith, honeycombed tubes extending approximately in the flow direction of the operating medium stream, a fill or the like. Basically at least one separating element for separating the most different side-by-side radial reactor regions is advantageous. In an especially simple embodiment channels, the honeycombed tubes, etc., are provided as separating element.

As needed the reactor unit can have a separate separating element. Especially a channel element, pipe element directed in the flow direction of the operating medium stream is provided in the interior region of a reactor unit, for example in a fixed bed reactor with a fill. For example, the channel element can be a metal pipe, ceramic pipe or the like.

Fundamentally the formation of a reactor inner region acted on in partial load operation by the operating medium stream, which is provided with a jacket region extending transversely to the flow direction of the operating medium stream, is of advantage. The operating medium stream acts in an advantageous manner on this outer jacket region in addition to the inner reactor region during full load operation according to the invention. The outer jacket region of the reactor unit advantageously provides a heat insulator unit in an advantageous manner during partial load operation.

Generally the control means for controlling or changing an effective cross-sectional area of the reactor volume acted on by the operating medium stream, which extends transversely to the flow direction of the operating medium stream, are arranged upstream of the reactor volume and/or the fixed bed reactor or the like. However it is conceivable that this control means is also arranged downstream of the reactor volume in the flow direction of the operating medium stream. In the case of this embodiment a reactor region through which the operating medium stream flows in partial load operation is formed. Further the operating medium stream flows into at least one partial region or part of the reactor, however it is also closed by the diaphragm element, slider element or the like, so that the operating medium stream is blocked in this part of the reactor. An appropriate "blocking" of the operating medium stream according to the invention does not mean that the operating medium stream is acted on in the sense of the invention, since the chemical transformation of the operating medium stream and/or its change in a suitably blocked region comes to a halt after a comparatively short time and/or a chemical equilibrium is established due to the reverse reaction.

In a special embodiment of the invention the control means or device is designed to control or change a length of the reactor and/or reactor volume extending in the flow direction of the operating medium stream. Alternatively or in combination with the above-mentioned embodiments of the invention an advantageous adjustment of the reactor volume can be accomplished with the help of changing the length of the reactor. A three-dimensional change of the part of the reactor volume that is effective in regard to chemical transformation or change is accomplished as needed.

Advantageously the reactor unit has at least two outlet openings for outflow of the converted operating medium stream. Possibly the operating medium stream flows through a comparatively small outlet opening in partial load operation and in full load operation both through the outlet opening for partial load operation and as needed through a second outlet opening arranged around the first outlet opening.

A distance or spacing is preferably provided between both outlet openings. In a special embodiment of the invention at least one of the outlet openings is arranged in front of another outlet opening in the flow direction, so that both outlet openings are spaced from each other in the longitudinal direction of the reactor unit. The outlet opening arranged in the flow direction upstream of the other outlet opening is provided in an advantageous manner for partial load operation of the reactor unit. The second outlet opening is preferably arranged downstream of the maximum or total reactor volume acted on by the operating medium stream, so that the operating medium stream flows through it during full load operation of the reactor unit.

At least one control valve for opening and/or closing the outflow opening or openings of the reactor unit is provided in an advantageous manner. With the help of this sort of control valve the flow through the reactor unit can be influenced in an advantageous manner. Preferably each outflow opening of the reactor unit has a control valve. The reactor volumes are changeable by means of a switching of suitable control valves provided for the respective outlet openings spaced from each other in the longitudinal direction along the reactor unit. For example, in full load operation a lateral outlet opening arranged in the reactor unit can be closed with the help of a suitable control valve and the outlet opening downstream in the longitudinal direction from the lateral outlet opening can be opened so that the operating medium stream flows through the maximum reactor volume.

In partial load operation of the last described reactor unit the control valve arranged downstream of the reactor volume and/or the corresponding outlet opening is closed and the lateral outlet opening provided in the reactor unit and/or the corresponding outlet opening is opened. In this case the operating medium stream flows into the maximum reactor volume in a first phase or mode of operation and is blocked in the reactor region downstream of the lateral outlet opening. This blocking in the sense of the invention does not mean acting on the operating medium stream. In a second operating phase or mode the operating medium stream only flows through the region of the reactor unit up to about the lateral outlet opening. Only this latter region is acted on during partial load operation according to the invention. The chemical transformation and/or change thus only takes place in the front region of the reactor unit and/or reactor volume.

In partial load operation of a reactor unit with a catalytically active fill or the like the operating medium stream flows out from the side of the reactor unit from the lateral outlet opening in an especially simple manner. Above all a reactor unit with honeycombed tubes extending in the longitudinal direction or the like is advantageously provided with transverse channels or the like extending at least transversely to the flow direction of the operating medium stream, especially in the vicinity of the lateral outlet opening. Because of this feature an advantageous lateral outflow is realized in partial load operation in these embodiments as well.

In a special embodiment of the invention the reactor unit includes at least two regions with different permeabilities. For example the different permeabilities are provided by different sizes or dimensions of the through-going passages, honeycombed tubes or the like.

The different permeabilities can be provided, as needed, by regions with different size fill material, particulate or the like in fixed bed reactors with a fill. A different porosity, especially different size empty spaces formed in the reactor bed, and/or different cell densities, are provided above all for optimization of the flow for different, advantageously spatially separated regions and/or segments of the reactor unit.

Alternatively or in combination the reactor unit can comprises at least two regions with different catalytically active coatings. For example, different catalyst materials and/or different noble metals and/or different thickness coatings and/or amounts of catalyst and/or noble metals per unit volume, can be provided.

Generally the different regions can be equipped in an advantageous manner according to the requirements of selectivity, price, service life or the like. Preferably the reactor regions through which the operating medium stream flows in partial load and also in full load operation are provided with an at least greater amount of catalyst material than other reactor regions, through which the operating medium stream flows during full load operation. For this purpose the different load and/or usage of the corresponding reactor regions are taken into account. The catalyst material and/or its permeability are provided accordingly.

Moreover it is conceivable that the reactor unit has at least two reactor apparatuses with different reactor volumes acted on by the operating medium stream. For example, one reactor apparatus with a clearly smaller reactor volume is acted on by the operating medium stream in partial load operation than another second reactor apparatus in full load operation. Similarly it is generally conceivable that small sized passages for the flow of the operating medium stream are provided to improve the dynamic behavior of the entire system. Possibly the partial load operation is performed by means of relative small-dimensioned by-pass passages and/or reactor units.

BRIEF DESCRIPTION OF THE DRAWING

The objects, features and advantages of the invention will now be illustrated in more detail with the aid of the following description of the preferred embodiments, with reference to the accompanying figures, in which

FIG. 3 is a diagrammatic perspective view of a reactor unit with control means according to the invention, which is divided axially and is provided with control valves for opening one of two flow paths.

DETAILED DESCRIPTION OF THE PREFERRED EMBODIMENTS

Figure 1:
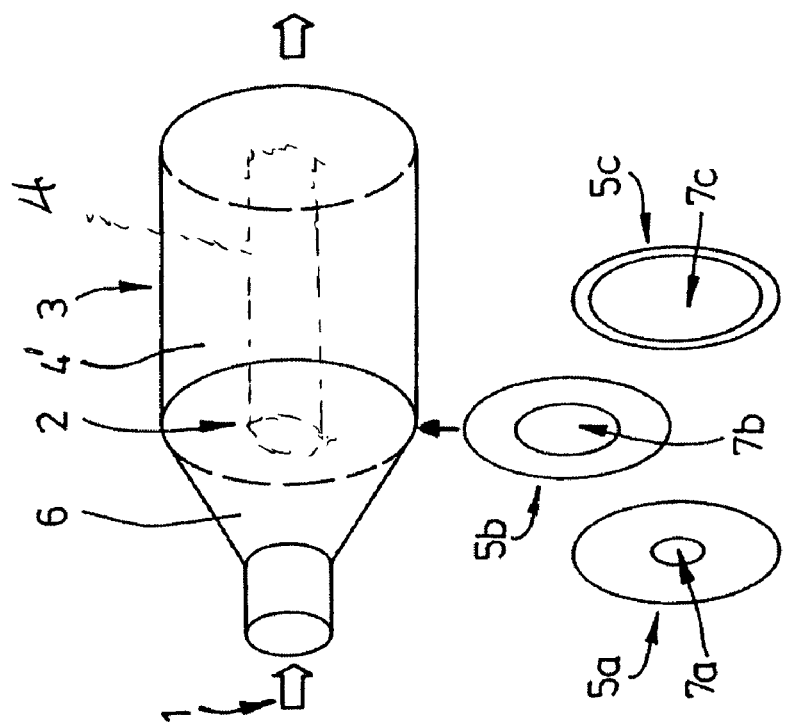
FIG. 1 is a diagrammatic perspective view of a reactor unit with control means according to the invention comprising a variable diaphragm device, in which different diaphragm geometric configurations are separately illustrated.
Figure 2:
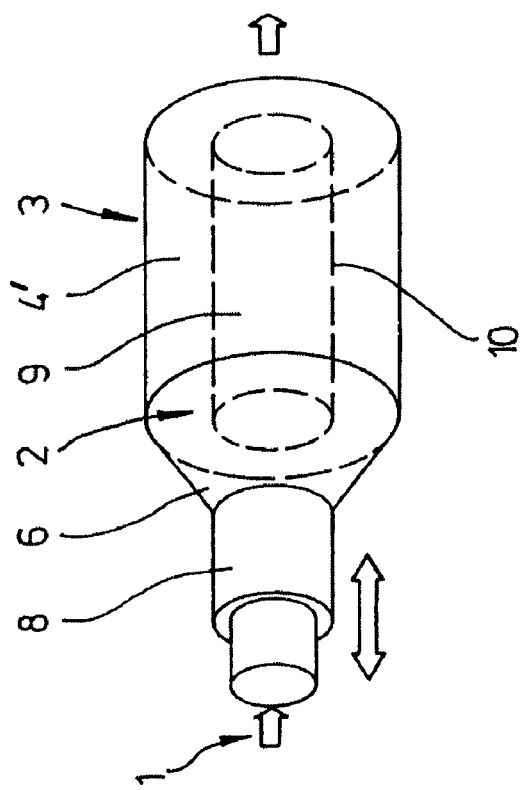
FIG. 2 is a perspective view of a reactor unit with control means according to the invention comprising an axially movable metering device.

Two different embodiments of the invention are shown in FIGS. 1 and 2, in which means for adjusting a cross-sectional area 2 extending transversely to the flow direction of the operating medium stream 1, for example of a reformer or reforming unit, is provided. For example, in partial load operation in this case the operating medium stream 1 only acts on or only passes through an inner reactor volume 4 of the reformer 3 and/or the fixed bed reactor 4', which is closest to its longitudinal axis.

Generally a reformer, gas purifying stage, burner or the like of an incompletely shown fuel cell system is not designed for maximum output, so that, for example, the flow during partial load operation is only about 1/10 of the flow during full load operation. Thus it is very greatly oversized in partial load operation. The heat loss during partial load operation is proportionally higher than in full load operation in the case of the prior art systems.

The reformer 3 according to FIG. 1, which does not show detail, is provided with nearly axially extending, especially honeycombed, flow passages in the fixed bed reactor 4'. The adjustment according to the invention of the reactor volume 4 acted on by the operating medium stream 1 takes place by means of a variable diaphragm device 5a, 5b, 5c in one embodiment of the invention according to FIG. 1. The diaphragm device 5a, 5b, 5c operates in a manner similar to a photo stop. The diaphragm device 5a, 5b, 5c is arranged preferably within a pre-mixing chamber 6 for reasons of tightness at high temperatures.

In partial load operation of the reactor unit 3 according to FIG. 1 the diaphragm device 5a, 5b, 5c is shown separately in, among other configurations, a comparatively closed configuration 5a. In this comparatively closed configuration an open inner cross-sectional area 7a is formed, which is substantially smaller than the entire cross-sectional area 2 of the fixed bed reactor 4'. Consequently the operating medium stream 1 only passes through an axial, comparatively small-volume inner region 4 of the fixed bed reactor 4', so that the comparatively small operating medium stream 1 flows through the reformer 3 with a comparatively greater flow speed or flow rate during partial load operation.

Correspondingly the diaphragm device 5a, 5b, 5c has a comparatively open inner cross-sectional area 7b in a partially closed configuration 5b and a correspondingly greater open cross-sectional area 7c in the open configuration 5c for passing the operating medium stream (1) through respective different sized regions of the fixed bed reactor 4' in correspondingly different partial load stages. It is hereby guaranteed that the effective reactor volume acted on by the operating medium stream 1 is adjusted to the actual requirements for an almost optimum transformation and/or operation and disadvantageous heat losses are minimized.

Preferably the diaphragm device 5a, 5b, 5c should be arranged as directly as possible at the catalytic bed 4. For example, the operating medium stream 1 flowing into the reactor unit 3 is sprayed or distributed largely uniformly over the entire cross-sectional area 2 of the reactor unit 3 with the help of an unshown nozzle or the like.

Generally the diaphragm device 5a, 5b, 5c can be constructed like a photo stop or mask or the like, preferably from a heat-resistant material. The electrical control of the diaphragm device 5a, 5b, 5c occurs in an advantageous manner by means of an unshown electrical control unit and/or adjusting mechanism.

In FIG. 2 an additional embodiment of the invention is shown, in which the cross-sectional area 2 acted on by the operating medium stream 1 is changeable. An axially movable metering pipe 8 is used in this embodiment. This metering pipe 8, for example, can be shifted in a way that is not shown in detail until at the fixed bed reactor 4', so that the pipe 8 almost or completely contacts the fixed bed reactor 4'. Thus only an inner catalyzing device or reactor volume 9 of the reformer 3 is acted effectively on by the operating medium stream 1.

By shifting or adjusting the metering pipe 8 to the left according to FIG. 2 the operating medium stream 1 flowing into the reactor unit 3 is distributed uniformly in the pre-mixing chamber 6 by means of a nozzle that is not illustrated in detail. For example, an injector with a conical form spray can be used, so that the cross-section 2 acted on by the operating medium stream 1 is changeable or can be increased or decreased according to the distance between the metering pipe 8 and the fixed bed reactor 4'. For example, in normal operation, especially in the middle to upper load range, the metering pipe 8 is positioned substantially at a left stop. In this position the operating medium stream 1 from the unillustrated nozzle or injector arrives through the positioned pipe 8 into the pre-mixing chamber 6 and is distributed nearly uniformly in it. In this case the entire cross-section 2 and/or the maximum cross-section 2 of the fixed bed reactor is acted on by the operating medium stream 1. The entire catalyzer 3 is thus used to its maximum extent.

In partial load operation, as already mentioned, the pipe 8 is pushed in to the fixed bed reactor 4' and generally the injected amount of operating medium stream 1 is reduced. An inner separating pipe 10 is provided as needed in the fixed bed reactor 4', which for example prevents any significant radial flow in the fixed bed reactor 4'. The separating pipe 10 is possibly made from metal and/or ceramic. Several preferably concentric separating pipes 10 can be provided, as needed, in the fixed bed reactor 4'.

In FIG. 3 another embodiment of the invention is shown diagrammatically, in which at least two flow paths through the reactor unit 3 are provided. For example, a valve 11 is connected to the reactor volume 4 at the downstream end of the reactor unit 3 and in full load operation this valve 11 is opened so that an outlet opening 15 of the reactor unit 3 is open. Then during full load operation the operating medium stream 1 flows through the maximum reactor volume of the fixed bed reactor 4' to the fuel cell unit via intermediate units or directly to the fuel cell unit, as shown in FIG. 3.

The valve 11 is closed and the valve 12 is opened in partial load operation of the reactor unit 3 according to FIG. 3, so that the operating medium stream 1 can be forced into the reactor and can flow out through a lateral outlet opening 13. Preferably the reactor unit 3 has a section 14 in the vicinity of the lateral outlet opening 13, which permits a transverse flow from the reactor unit 3. For example the transverse section 14 comprises transverse ducts or the like.

In a variant of the embodiment of the invention according to FIG. 3 an adjustment and/or change of a length of the reactor volume 4 takes place. In the sense of the invention in partial load operation the rear region of the fixed bed reactor 4' is not acted on by operating medium stream 1, since it is blocked in this reaction and thus continuous chemical conversion of the operating medium stream 1 is generally prevented. In partial load operation only the front region of the fixed bed reactor 4' is formed for continuous conversion of the operating medium stream 1.

Generally in the reactor unit 3 according to the invention the active region for partial load operation can be provided both with different catalytically active materials and/or noble metals and with different amounts of catalytic materials per unit volume in comparison to the remaining region of the reactor unit 3. Moreover in an advantageous manner an adjustment of the flow condition can be provided with different operating modes.

The disclosure in German Patent Application 102 51 565.4 of Nov. 6, 2002 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a fuel cell system with a reactor unit, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A fuel cell system comprising
a fuel cell unit; and
a catalytically active reactor unit for at least partial chemical transformation of an operating medium stream, wherein the catalytically active reactor unit has a catalytically active reactor volume acted on by the operating medium stream and the catalytically active reactor unit comprises at least one control means for controlling and/or for changing the catalytically active reactor volume acted on by the operating medium stream, wherein said at least one control means comprises at least one diaphragm device changeable transverse to a flow direction of the operating medium stream.

2. The fuel cell system as defined in claim 1, wherein said catalytically active reactor unit is a reformer, gas purifier stage and/or a combustor.

3. The fuel cell system as defined in claim 1, wherein said at least one control means comprises means for controlling and/or changing a cross-sectional area of said reactor volume and said cross-sectional area extends transverse to a flow direction of the operating medium stream.

4. The fuel cell system as defined in claim 1, wherein said catalytically active reactor unit has at least two outlet openings for outflow of a converted operating medium flow.

5. The fuel cell system as defined in claim 4, further comprising at least one control valve for opening or closing at least one of said outlet openings of the catalytically active reactor unit.

6. The fuel cell system as defined in claim 4, wherein said catalytically active reactor unit is provided with a plurality of transverse channels extending transversely to a flow direction of the operating medium stream.

7. The fuel cell system as defined in claim 1, wherein said catalytically active reactor unit comprises at least two reactor regions with respective different permeabilities.

8. A vehicle containing said fuel cell system as defined in claim 1.

9. A fuel cell system, comprising:
a fuel cell unit; and
a catalytically active reactor unit for at least partial chemical transformation of an operating medium stream, wherein the catalytically active reactor unit has a catalytically active reactor volume acted on by the operating medium stream and the catalytically active reactor unit comprises at least one control means for controlling and/or for changing the catalytically active reactor volume acted on by the operating medium stream, wherein said at least one control means comprises a control element movable in a flow direction of the operating medium stream.

10. The fuel cell system as defined in claim 9, wherein said control element comprises a pipe.

11. The fuel cell system as defined in claim 9, wherein said control element comprises, at least partially, a nozzle and/or an injector.

12. A fuel cell system, comprising:
a fuel cell unit; and
a catalytically active reactor unit for at least partial chemical transformation of an operating medium stream, wherein the catalytically active reactor unit has a catalytically active reactor volume acted on by the operating medium stream and the catalytically active reactor unit comprises at least one control means for controlling and/or for changing the catalytically active reactor volume acted on by the operating medium stream, wherein said at least one control means comprises means for controlling a length of said reactor volume, said length extending in a flow direction of the operating medium stream.

13. A fuel cell system, comprising:
a fuel cell unit; and
a catalytically active reactor unit for at least partial chemical transformation of an operating medium stream, wherein the catalytically active reactor unit has a catalytically active reactor volume acted on by the operating medium stream that flows in a predetermined flow direction through the catalytically active reactor unit to an outlet opening, and the catalytically active reactor unit comprises at least one control means for controlling and/or for changing the catalytically active reactor volume acted on by the operating medium stream, wherein at least another outlet opening is arranged upstream of said first-mentioned outlet another in the flow direction of the operating medium stream.

14. A fuel cell system, comprising:
a fuel cell unit; and
a catalytically active reactor unit for at least partial chemical transformation of an operating medium stream, wherein the catalytically active reactor unit has a catalytically active reactor volume acted on by the operating medium stream and the catalytically active reactor unit comprises at least one control means for controlling and/or for changing the catalytically active reactor volume acted on by the operating medium stream, wherein said catalytically active reactor unit comprises at least two reactor regions with respective different catalytically active coatings.

15. A method of operating a fuel cell system, wherein said fuel cell system comprises a fuel cell unit and a catalytically active reactor unit for at least partial chemical transformation of an operating medium stream, wherein the catalytically active reactor unit has a catalytically active reactor volume acted on by the operating medium stream and the catalytically active reactor unit comprises at least one control means for controlling and/or for changing the catalytically active reactor volume acted on by the operating medium stream; said method comprising adjusting said catalytically active reactor volume with said at least one control means so that a smaller reactor volume is acted on by the operating medium stream during partial load operation than during full load operation, wherein said at least one control means comprises a variable diaphragm device arranged transversely to a flow direction of said operating medium stream and said adjusting comprises changing a size of said variable diaphragm device.

* * * * *